(12) United States Patent
Ward

(10) Patent No.: US 6,485,632 B1
(45) Date of Patent: Nov. 26, 2002

(54) APPARATUS AND METHOD FOR RECLAIMING WASTE OIL FOR USE AS FUEL FOR A DIESEL ENGINE

(76) Inventor: Michael S. Ward, 8708 Directors Row, Dallas, TX (US) 75327

( * ) Notice: Subject to any disclaimer, the term of this patent is extended or adjusted under 35 U.S.C. 154(b) by 0 days.

(21) Appl. No.: 09/632,438

(22) Filed: Aug. 4, 2000

(51) Int. Cl.7 ............................................. C10M 175/00
(52) U.S. Cl. ......................... 208/179; 208/180; 44/629; 44/639; 137/9
(58) Field of Search ................................ 208/179, 180; 139/9; 44/629, 639

(56) References Cited

U.S. PATENT DOCUMENTS

| | | | |
|---|---|---|---|
| 3,695,485 A | * 10/1972 | Littlejohn | .................... 222/68 |
| 4,061,473 A | 12/1977 | Norris | |
| 4,095,571 A | 6/1978 | Fleetwood et al. | |
| 4,170,551 A | 10/1979 | Honour | |
| 4,360,436 A | 11/1982 | Poveromo | |
| 4,376,373 A | 3/1983 | Weber et al. | |
| 4,417,561 A | 11/1983 | Yasuhara | |
| 4,784,751 A | 11/1988 | McGehee | |
| 5,336,396 A | 8/1994 | Shetley | |
| 5,353,760 A | 10/1994 | Zager | |
| 5,476,073 A | 12/1995 | Betts | |
| 5,507,307 A | 4/1996 | Montegari et al. | |
| 5,881,688 A | * 3/1999 | Graham et al. | ........ 123/73 AD |

FOREIGN PATENT DOCUMENTS

| | | | |
|---|---|---|---|
| WO | WO 00/37590 | * | 6/2000 |

* cited by examiner

*Primary Examiner*—Walter D. Griffin
(74) *Attorney, Agent, or Firm*—Shughart Thomson & Kilroy, P.C.; Mark E. Brown

(57) ABSTRACT

An apparatus and method for reclaiming waste oil for use as fuel for a diesel engine. A mixing tank is provided, along with a waste oil transfer pump for supplying waste oil to the mixing tank, a fuel proportioning pump for supplying a proportional amount of light fuel oil to the mixing tank, and a heating unit for heating the oil-fuel mixture. An additive proportioning pump may also be provided for supplying chemical fuel additives such as emulsifiers and combustion improvers to the mixing tank. A fuel delivery pump delivers the heated oil-fuel mixture from the mixing tank to a diesel engine for use as fuel. Pre-filters are provided to remove a large portion of the particulate material from the waste oil before it is delivered to the mixing tank, and final filters remove additional contaminants from the oil-fuel mixture before it reaches the engine.

15 Claims, 2 Drawing Sheets

APPARATUS AND METHOD FOR RECLAIMING WASTE OIL FOR USE AS FUEL FOR A DIESEL ENGINE

BACKGROUND OF THE INVENTION

1. Field of the Invention

The present invention relates to an apparatus and method for using a mixture of waste oil and fresh fuel oil as fuel for a diesel engine, and more particularly to an apparatus and method whereby a diesel engine can be run using a heated oil-fuel mixture that is less than five percent fresh fuel oil.

2. Description of the Related Art

It has been previously known to dispose of waste oil by mixing a small percentage of the waste oil with diesel fuel and burning the mixture in a diesel engine. For example, U.S. Pat. No. 5,507,307 to Montegari et al. discloses a method and apparatus for recycling waste lubricating oil for reuse as fuel oil wherein waste oil is blended with fuel oil, the mixture being from zero to ten percent waste oil. U.S. Pat. No. 4,095,571 to Fleetwood et al. discloses a filtering and mixing apparatus for automatically removing used lubricating oil from the sump of an engine and combining the oil with the engine's fuel supply. It is stated that the ratio of lubricating oil to fuel oil does not exceed five percent.

Waste oil has been combined with fuel oil in higher concentrations for use as fuel in furnaces or steam boilers, however these applications are not as sensitive to the presence of contaminants or to the viscosity of the fuel as is a diesel engine. The fuel injectors of a diesel engine are easily clogged or eroded by contaminated fuel.

Disposal of waste oil is an increasing environmental problem and it would clearly be advantageous to be able to reclaim more of this troublesome substance and convert it into useful energy by using it as fuel for diesel engines at higher concentrations.

SUMMARY OF THE INVENTION

The present invention comprises an apparatus and method for reclaiming waste oil for use as fuel for a diesel engine. The apparatus includes a mixing tank, a waste oil transfer pump which supplies waste oil to the mixing tank, and a fuel proportioning pump which supplies a proportional amount of light fuel oil to the mixing tank to form an oil-fuel mixture. The apparatus may also include an additive proportioning pump which supplies chemical fuel additives such as emulsifiers and combustion improvers to the mixing tank. A heating unit is installed in the mixing tank for purposes of heating the oil-fuel mixture in order to control the viscosity of the mixture. A fuel delivery pump delivers the heated oil-fuel mixture from the mixing tank to a diesel engine for use as fuel.

The apparatus also includes two sets of filters for removing contaminants. A set of pre-filters removes a large portion of the particulate material from the waste oil before it is delivered to the mixing tank, and a set of final filters removes additional contaminants from the oil-fuel mixture before it reaches the engine.

The waste oil transfer pump, fuel proportioning pump, and additive proportioning pump are electrically powered, and are controlled by a fluid level switch associated with the mixing tank. When the level of oil-fuel mixture in the tank drops to a low condition, the fluid level switch closes which causes the pumps to begin operating, thereby supplying the correct proportions of waste oil, fuel oil, and additives to the mixing tank. When the level of oil-fuel mixture reaches a full condition, the switch opens, shutting off the pumps.

In order to match the output of the fuel delivery pump to the requirements of the diesel engine, the apparatus includes a bypass valve installed in the fuel line between the final filters and the diesel engine. The bypass valve directs the amount of the oil-fuel mixture required by the engine injection pump into the engine fuel supply line and recirculates the excess back to the mixing tank.

Because the diesel engine can be difficult to start using an oil-fuel mixture with a high percentage of waste oil, the apparatus also includes a start valve, which can selectively switch the engine over to a supply of fresh fight fuel oil during starting. After the engine is running, it can be switched back to the oil-fuel mixture.

The method for reclaiming waste oil for use as fuel for a diesel engine comprises the steps of collecting and storing a supply of waste oil; mixing the waste oil with light fuel oil to form an oil-fuel mixture; heating the oil-fuel mixture; and delivering the heated oil-fuel mixture to a diesel engine for use as fuel. The mixing step can optionally include adding chemical additives such as emulsifiers and combustion improvers to the oil-fuel mixture. Filtering steps can be included before the mixing step and/or between the heating step and the delivering step.

OBJECTS AND ADVANTAGES OF THE INVENTION

The principal objects and advantages of the present invention include: providing an apparatus and method for reclaiming waste oil for use as fuel for a diesel engine; providing such an apparatus and method which allow a diesel engine to run on oil-fuel mixtures having as little as five percent fresh light fuel oil content; and providing such an apparatus which is economical to manufacture, efficient in operation, capable of long operating life and particularly well-adapted for the proposed usage thereof.

DETAILED DESCRIPTION OF THE PREFERRED EMBODIMENT

Figure 1:
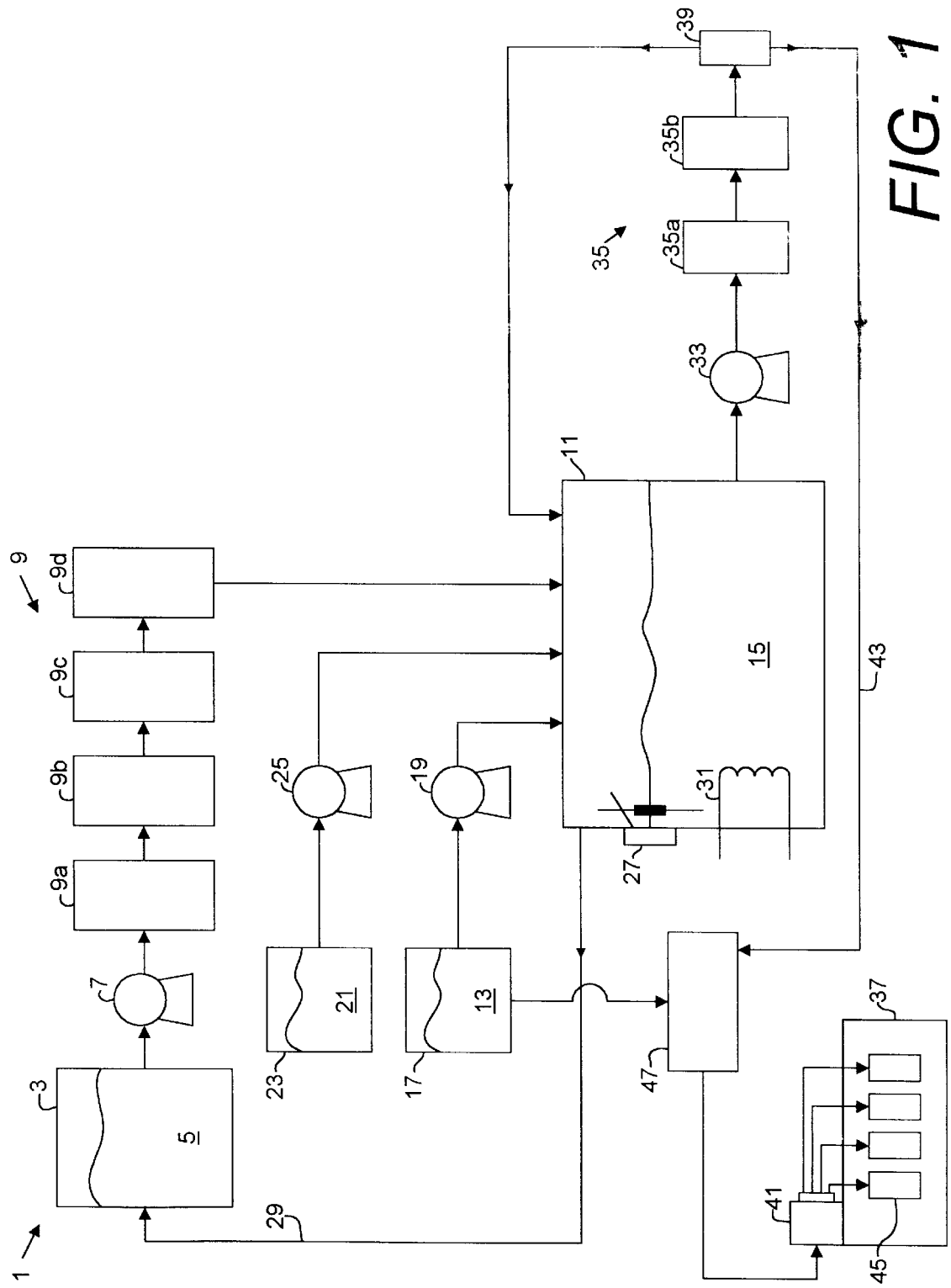
FIG. 1 is a block diagram showing the apparatus embodying the present invention in combination with a diesel engine.
Figure 2:
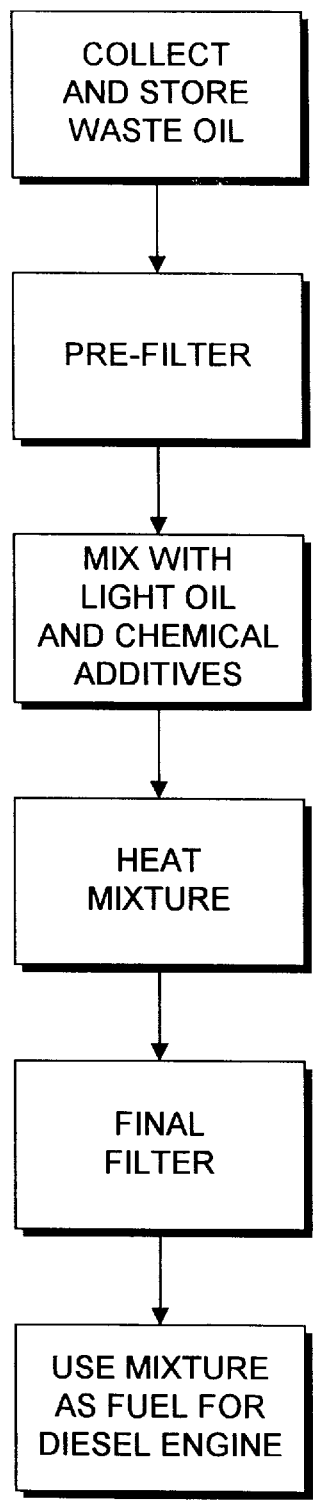
FIG. 2 is a block diagram showing the various steps of the method embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the waste oil reclamation apparatus, indicated generally by the reference numeral 1, includes a waste oil storage tank 3 wherein used motor oil or other contaminated or waste oil 5 is collected and stored. Waste oil 5 is drawn out of storage tank 3 by a waste oil transfer pump 7 and delivered to a series of pre-filters 9 which are adapted to remove a large percentage of the particulate contaminants from the waste oil 5. The pump 7 is preferably a positive displacement pump such as the Suntec Industries Inc. model J3NBN-A1328. The series of pre-filters 9 is composed of a plurality of individual filters arranged so that each progressive filter in the series 9 has a finer filter medium than the previous filter and is therefore capable of removing smaller particles. For example, four filters 9a–9d are shown, with 9a being a 40 micron filter, 9b being a 20 micron filter, 9c being a 10 micron filter and 9d being a 5 micron filter.

After leaving the pre-filters 9, the waste oil 5 flows into a mixing tank 11 where it is combined with a proportionate amount of a fight fuel oil 13 such as kerosene or diesel fuel. The light oil 13 is delivered from a supply tank 17 to the mixing tank 11 by means of a fuel proportioning pump 19. Chemical fuel additives 21, for example emulsifiers and combustion improvers such as those manufactured by the Treat-O-Lite company, may also be introduced into the mixing tank 11 from a reservoir 23 by means of an additive proportioning pump 25. Pumps 19 and 25 are preferably peristaltic pumps, such as the Dolphin Model 50, because these pumps have flow rates which are easily adjustable to provide the correct proportions of light oil 13 and additives 21 to match the flow of waste oil 5 entering the mixing tank 11.

In the preferred embodiment of the present invention, the mixing tank 11 is equipped with a fluid level switch 27 which controls pumps 7, 19, and 25. When the fluid level in the tank 11 drops to a low condition, the switch 27 closes, causing pumps 7, 19, and 25 to be energized, thereby filling the tank 11 with the proper mixture of waste oil 5, light fuel oil 13, and additives 21. When the tank 11 reaches its full level, the switch 27 opens, shutting off pumps 7, 19, and 25. An overflow line 29 is provided in case of a failure of the switch 27. Should the tank 11 overfill, the overflow line 29 directs the excess oil-fuel mixture 15 back to the waste oil storage tank 3.

The mixing tank 11 includes a heating unit 31 which is preferably electric, but hot water heating could also be used. The heating unit 31 is used to heat the oil-fuel mixture 15 in order to lower its viscosity and make it flow more easily. The oil-fuel mixture 15 can be heated to a temperature of up to 180 degrees F., but the preferred temperature is 115 degrees F.

Heated oil-fuel mixture 15 is extracted from the mixing tank by a fuel delivery pump 33, and delivered to a set of final filters 35 which is composed of a plurality of individual filters arranged so that each progressive filter in the set has a finer filter medium than the previous filter. Two filters 35a and 35b are shown, with 35a being a 2 micron filter and 35b being a 1 micron filter.

After exiting the final filters 35, the heated oil-fuel mixture 15 has been rendered suitable for use as fuel by a diesel engine 37. Heating of the oil-fuel mixture 15 lowers the viscosity of the mixture 15 enough that a mixture which has a light fuel oil content of less than five percent can be utilized successfully.

A bypass valve 39 is included in the fuel line between the final filters 35 and the diesel engine 37 in order to match the output of the fuel delivery pump 33 to the requirements of the engine injection pump 41. The bypass valve 39 directs the amount of the oil-fuel mixture 15 required by the engine injection pump 41, into the fuel supply line 43 and recirculates the excess back to the mixing tank 11.

The diesel engine 37 requires only minor modifications to run on the heated oil-fuel mixture 15. Because the oil-fuel mixture 15 is heavier than fresh fuel oil 13, the orifices in the fuel injectors 45 need to be enlarged from their original diameter, which is typically in the area of 0.0001 inches, to a diameter of 0.0002 to 0.0005 inches. The engine 37 is preferably equipped with a turbocharger, not for increased horsepower, but for purposes of increasing airflow to provide a leaner air-fuel ratio and thereby decrease the amount of unburned hydrocarbons in the engine exhaust.

In order to make starting the diesel engine 37 easier, a three way valve 47 is provided which allows the engine 37 to be started on pure light fuel oil 13 and then switched over to the oil-fuel mixture 15 once the engine 37 is running.

The diesel engine 37 can be either stationary or mobile and can be utilized for generating electricity, pumping water, running refrigeration equipment, or any of a variety of other uses.

What is claimed is:

1. An apparatus for reclaiming waste oil for use as fuel for a diesel engine, said apparatus comprising:
    a) a mixing tank;
    b) a source of waste oil;
    c) a source of light fuel oil;
    d) a first pump adapted to supply waste oil from said source of waste oil to said mixing tank at a first flow rate;
    e) a second pump adapted to supply light fuel oil from said source of fight fuel oil to said mixing tank at a second flow rate proportional to said first flow rate, the light fuel oil blending with the waste oil in said mixing tank to form an oil-fuel mixture;
    f) a heating unit installed in said mixing tank for heating the oil-fuel mixture;
    g) a fuel line connectable to a diesel engine for communicating the heated oil-fuel mixture from said mixing tank to the diesel engine; and
    h) a three-way start valve controlling flow through said fuel fine, said start valve further being in communication with a source of light fuel oil and adapted to selectively provide only light fuel oil to the diesel engine during start-up so as to facilitate starting of the diesel engine, said start valve being further adapted to selectively supply the heated oil-fuel mixture to the diesel engine after the diesel engine is started.

2. The apparatus as in claim 1, wherein:
    a) said first and second pumps are electrically driven; and
    b) a fluid level switch is associated with said mixing tank, said switch being responsive to the level of oil-fuel mixture in said tank, said switch being closed when the level reaches a low condition and open when the level reaches a full condition, said switch controlling electric power to said first and second pumps.

3. The apparatus as in claim 1, further comprising a third pump for supplying chemical additives from a source of chemical additives to said mixing tank at a third flow rate proportional to said first flow rate, the chemical additives blending with the oil-fuel mixture in said mixing tank.

4. The apparatus as in claim 3, wherein:
    a) said first, second, and third pumps are electrically driven; and
    b) a fluid level switch is associated with said mixing tank, said switch being responsive to the level of oil-fuel mixture in said tank, said switch being closed when the level reaches a low condition and open when the level reaches a full condition, said switch controlling electric power to said first, second, and third pumps.

5. The apparatus as in claim 1, further comprising at least one pre-filter interposed between said first pump and said mixing tank.

6. The apparatus as in claim 1, further comprising at least one final filter mounted in said fuel line.

7. The apparatus as in claim 1, further comprising a bypass valve mounted in said fuel line, said bypass valve being capable of directing an amount of oil-fuel mixture sufficient to meet the requirements of the diesel engine to the diesel engine and recirculating surplus oil-fuel mixture back to said mixing tank.

8. The apparatus as in claim 1, wherein the proportion of said second flow rate to said first flow rate is such that the oil-fuel mixture is less than five percent light fuel oil.

9. A method of converting waste oil to useable mechanical energy comprising the steps of:
   a) collecting and storing a supply of waste oil;
   b) mixing the waste oil with light fuel oil to form an oil-fuel mixture;
   c) heating the oil-fuel mixture;
   d) providing a diesel engine adapted to burn the heated off-fuel mixture as fuel;
   e) connecting said diesel engine to said mixing tank via a fuel line;
   f) providing a three-way star valve in said fuel line, said start valve being in communication with a source of fight fuel oil and adapted to selectively supply said diesel engine with either the heated oil-fuel mixture or light fuel oil;
   g) starting said diesel engine while selectively supplying only light fuel off to said diesel engine through said start valve;
   h) after said diesel engine starts, supplying the heated oil-fuel mixture to said diesel engine through said start valve for use as fuel; and
   i) using said diesel engine to produce mechanical energy.

10. The method of claim 9, wherein said mixing step further includes adding chemical additives to the oil-fuel mixture.

11. The method of claim 9, wherein the oil fuel mixture produced in said mixing step is less than five percent light fuel oil.

12. The method of claim 9, further comprising the step of filtering the waste oil before said mixing step.

13. The method of claim 9, further comprising the step of filtering the oil-fuel mixture after said heating step and before supplying the heated oil-fuel mixture to said diesel engine.

14. The method of claim 9, wherein said step of providing a diesel engine further comprises the step of resizing fuel injectors of the diesel engine.

15. The method of claim 9, wherein said step of providing a diesel engine further comprises the step of providing a turbocharger for said diesel engine.

\* \* \* \* \*